(No Model.) 2 Sheets—Sheet 1.

H. A. PIERCE.
CABLE RAILROAD.

No. 414,821. Patented Nov. 12, 1889.

Witnesses
M. E. Fowler
Wm. Bagger

Inventor
Henry A. Pierce
By his Attorneys,
C. A. Snow & Co.

(No Model.) 2 Sheets—Sheet 2.

H. A. PIERCE.
CABLE RAILROAD.

No. 414,821. Patented Nov. 12, 1889.

Witnesses
M E Fowler
Wm. Bagger

Inventor
Henry A. Pierce
By his Attorneys,
C A Snow & Co.

UNITED STATES PATENT OFFICE.

HENRY A. PIERCE, OF CHICAGO, ILLINOIS.

CABLE RAILROAD.

SPECIFICATION forming part of Letters Patent No. 414,821, dated November 12, 1889.

Application filed July 9, 1889. Serial No. 316,970. (No model.)

*To all whom it may concern:*

Be it known that I, HENRY A. PIERCE, a citizen of the United States, residing at Chicago, in the county of Cook and State of Illinois, have invented a new and useful Cable Railroad, of which the following is a specification.

This invention relates to cable railoads; and it has for its object to provide a device by means of which the cable may be automatically released from the grip at certain points where such release or disengagement shall be required; and the invention consists in the improved construction and arrangement of parts which will be hereinafter fully described, and particularly pointed out in the claims.

In cable railroads at certain points it is necessary to release the cable entirely from the grip in order to allow the car to run a certain distance entirely independent of the cable. This is found necessary in certain places—for instance, at the terminus or turning-point of one cable and before reaching the next. Difficulty has sometimes been experienced in causing the cable to leave the grip as the car approaches the terminus or turning-point of the cable, the principal reason of this being that by continued use a groove is worn in the lower grip-plate which retains the cable in such a manner as to render it difficult to displace it by ordinary means. It has been customary to construct trap-doors near the terminus or turning-point of the cable, in order to enable attendants to observe whether or not the cable has left the grip, and in the latter case to pry it out by the use of suitable instruments. Sometimes, however, it happens that the gripman is unable to stop his car with the requisite promptness or the fact that the cable has not left the grip fails to be noticed, and in either of these cases the car continues its course, with the result of either breaking the cable or seriously injuring the car, or both.

By my present invention I propose to obviate the possibility of serious consequences arising from the failure of the cable to leave the grip; and to this end my invention, as stated, consists, essentially, in mechanism for automatically releasing the cable, the construction of which I shall now proceed more fully to describe with reference to the drawings, in which—

Figures 1, 2:
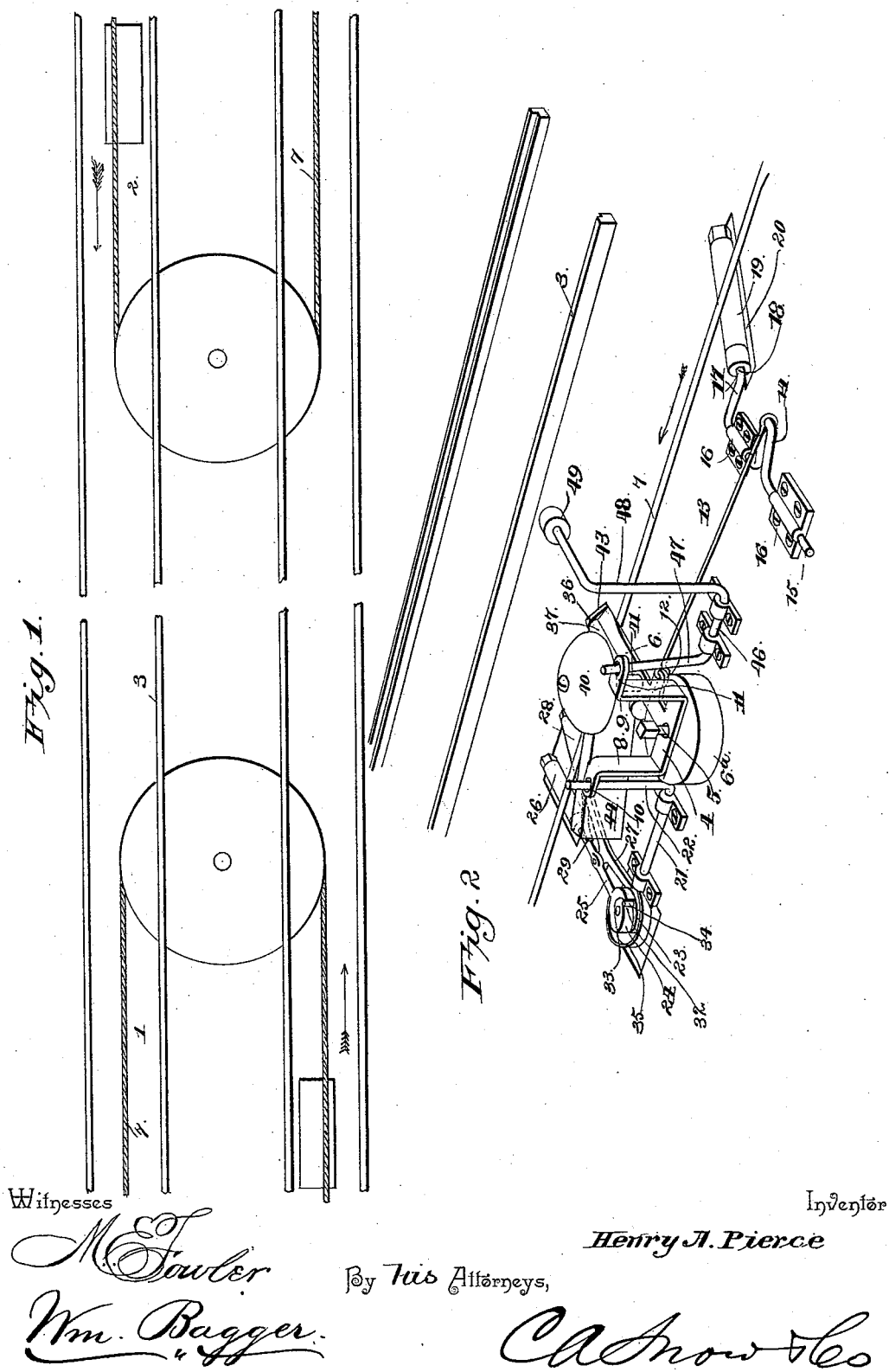
Figure 3:
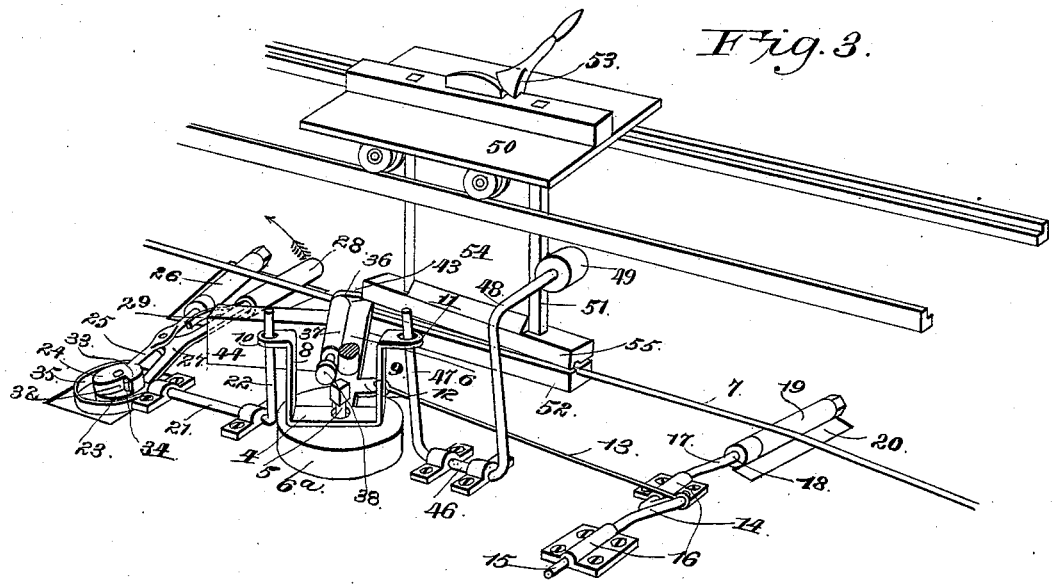
Figure 4:
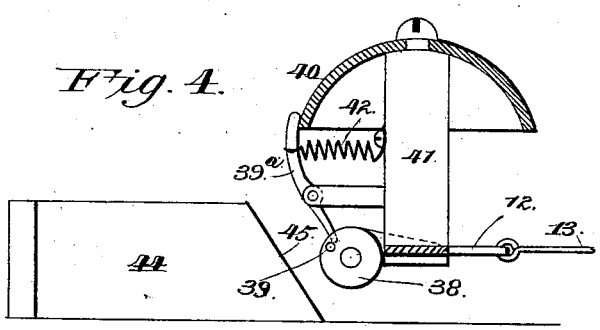
Figure 6:
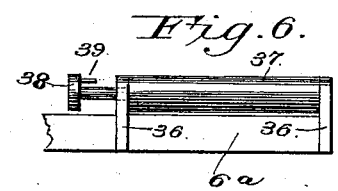
Figure 5:
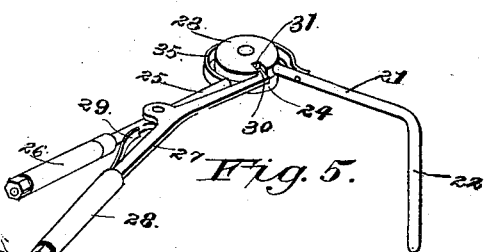

Figure 1 is a diagram of a cable railway, showing my invention applied at the terminus or turning-point of one of the cables. Fig. 2 is a perspective view of the mechanism comprised in my invention. Fig. 3 is a perspective view illustrating the operation of the invention. Fig. 4 is a vertical transverse sectional view taken through the gong or alarm mechanism and adjacent parts. Fig. 5 is a detail view of one of the levers for disengaging the cable from the grip and the mechanism for throwing said lever out of gear, showing the same in an inverted position. Fig. 6 is a detail view of the roller 37 and its bearings.

Like numerals of reference indicate like parts in all the figures.

In the diagram, Fig. 1 of the drawings hereto annexed, 1 and 2 designate the two cable lines of my improved railroad, the turning-points or termini of which are at what I shall designate, respectively, as the "north" and "south" ends of an intermediate space—such as a tunnel—where no cable is employed.

3 designates the track, which extends continuously over the intermediate space. Two lines of track running, respectively, north and south are as often employed, and it will be obvious that the grips of all cars running either north or south must be disengaged from the cables before arriving at the terminus of either line. This may sometimes be accomplished by the gripman by simply operating the grip-lever so as to loosen the grip, and then slightly tilting the latter, when the cable will frequently leave the grip of its own accord. When this does not take place, however, the disengagement will be effected automatically by my improved mechanism, which is as follows:

4 designates a plate or lever which is mounted pivotally by means of a vertical bolt or pin 5 upon a block or plate 6ª, located adjacent to and at some distance from the cable, but in such a manner as to permit an arm 6, extending laterally from said lever above and across the cable 7 to vibrate slightly in an upward direction. The lev- 4 is provided at its ends with upwardly-extending arms 8 and 9, the upper ends of which have outwardly-extending brackets 10 and 11, which are perforated, as shown. The arm 6 is provided with a laterally-extending bracket 12, which is connected by a rod or chain 13 with an arm or crank 14, extending from a rock-shaft 15, which is journaled in suitable bearings, (shown at 16.) The end of the rock-shaft 15 adjoining the cable has an arm 17, from which extends a diagonal spindle 18, upon which is journaled a roller 19, which normally lies in a recess 20 directly below the cable. On the opposite side of the block or bearing 6 is located a rock-shaft 21, which is parallel to the cable, and which is provided at its inner end with an arm or crank 22, extending upwardly through the perforation in the bracket 10, attached to or forming part of the arm 8 of lever 4. The outer end of the rock-shaft 21 has a horizontal disk 23, on which is pivoted another disk 24, having an arm 25, which extends under the cable and is provided at its outer end with a roller 26. Pivoted to the under side of the arm 25 is a bent lever 27, the outer end of which has a roller 28, which extends under the cable. The said outer end of the bent lever 27 is also provided with a spring 29, bearing against the arm 25 and serving to hold the outer end of the lever 27 apart from said arm 25. The inner end of the lever 27 has a lug or stud 30, adapted to engage a recess 31 in the disk 23, and thus holding the arm 26, carrying the roller 26 and the disk 24, securely with relation to said disk 23. The disk 24 has a recess 32, forming a ratchet or shoulder 33, adapted to bear against a pin or stud 34, that extends upwardly from the disk 23. Attached to the rock-shaft 21 is a spring 35, which is curved around the pivoted disk 24 and bears against the arm 25. It will be seen that when lateral pressure is exerted upon the roller 28 in the direction of the arrow the lever 27 will swing or vibrate upon its fulcrum, thereby disengaging the lug 30 at the inner end of said lever from the recess 31 and enabling the arm 25, carrying the roller 26, to swing around in the direction of the arrow. (See Figs. 3 and 5.) When the pressure against the roller 28 is released, the tension of the spring 35 causes the arm 25 to be returned to its original position until the shoulder or ratchet 33 is in contact with the pin or stud 34, which latter acts simply as a stop. At this point the lug 30 will again engage the recess 31, and the several parts will thus have been automatically restored to their original position.

The arm 6, extending from the lever 4, is provided on the side facing the roller 28 with bearings 36, in which is journaled a roller 37. The shaft of the latter is extended at its inner end and is provided with a disk 38, having a laterally-extending pin 39, (see Fig. 6,) which, when the roller is rotated in the direction of the arrow, serves to engage a suitably-pivoted hammer 39$^a$, adapted to strike a bell or gong 40, which is mounted upon an upright 41, rising from the arm 6. A spring 42 serves to throw the hammer in an inward direction, as is usual in this class of gongs or alarm-bells. It has already been stated that the arm 6 extends over and across the cable, and it will be obvious that the roller 37 is likewise located above the cable. The outer bearing 36 of the roller 37 is beveled, as shown at 43, (see Fig. 2,) for the purpose of offering no resistance or obstruction to the passage of the grip, as will be hereinafter described.

44 designates a block located between the rollers 37 and the lever 27, and having a beveled end 45 (see Fig. 4) adjacent to the said roller 37 for the purpose of preventing the latter from accidentally slipping below the cable when the device is in operation.

46 designates a rock-shaft located adjacent to the block 6 on the side of said block opposite to the rock-shaft 21. The said rock-shaft is provided on its inner end with an arm 47, extending upwardly through the perforation in the bracket 11 at the upper end of the arm 9 of lever 4. At its outer end the rock-shaft 46 is provided with an upwardly-extending bent arm or handle 48, carrying a hammer 49.

50 designates a grip-car.

51 is the grip-frame, having the lower grip-section 52.

53 is the grip-lever, which is pivoted to the car-frame, and which operates the center plate 54, carrying the upper grip-section 55. In these parts, which have relation only to the construction of the grip-car and grip, no novelty is claimed; neither do I claim any novelty in the construction of the cable line proper.

In operation let it be understood that the cable is moving in the direction indicated by arrows in the diagram and in the several figures of the drawings. When the grip-car approaches the terminus of the cable line, the gripman will release the grip-lever and endeavor to disengage the cable from the grip. When he succeeds in doing this, the cable will drop down upon its supporting-pulleys and the grip will pass over the arm 6 of my improved mechanism without disturbing the latter; but if the grip fails to drop the cable the latter will raise or elevate the arm 6, carrying the roller 37. The latter by its frictional contact with the cable will be rotated, thus actuating the hammer 39 and sounding the alarm-bell 40, thereby warning the gripman that the cable has not left the grip. At the same time the upper grip-section 55 will strike against the arm 6, forcing the latter aside and causing it to enter between the grip-sections and escape between the latter. The lever 4 being thus turned or swung upon its bolt or pivot, the rock-shafts 21 and 15 will be actuated by the mechanism connecting said rock-shafts with the arms 8 and 6 of lever 4. The rollers 26, 28, and 19 will thus be caused to bear against the under side of the cable, lifting and crowding against the latter, so as to force it out from between the grip-jaw sections. When the lower grip-section 52 comes in contact with the roller 28, the lug 30 of lever 27 will be disengaged from its recess 31, and the arm 25, carrying the roller 26, will thus be permitted to swing aside and out of the way of the grip. When the latter has passed and is out of contact with the roller 26, the latter and adjacent parts will be automatically restored to their normal and operative position by the mechanism which has been previously described. In case it should happen that the gripman neglects to release the grip-lever, there would evidently be danger of my improved mechanism being broken, because there would be no way for the arm 6, carrying the roller 37, to escape from contact with the grip. If this should occur, the arm 6 on being engaged by the grip when the car is traveling at or nearly at the speed of the cable will be swung aside with great force, and the rock-shaft 46, carrying the hammer 49, will then be operated by the arm 9 of lever 4 with such force as to cause the hammer 49 to strike against and to break the center plate 54 of the grip, which is constructed in the usual manner of cast-iron or other suitable frangible material. The grip-sections 52 and 55 will then be able to separate and to admit of the passage between them of the arm 6, carrying the roller 37. It will be observed that the hammer 49 will be brought into requisition for the purpose of breaking the center plate only in case of actual neglect of the gripman—that is, when he fails to release the grip-lever and when, consequently, it is impossible for the jaws to part or separate for the passage of the arm 6 and its attachments.

It will be understood that this device may in practice be changed and modified in many minor details without affecting its general character or impairing its successful operation, and I desire it to be understood that I reserve the privilege of making any such changes and modifications as may be resorted to without departing from the spirit of my invention.

Having thus described my invention, what I claim, and desire to secure by Letters Patent, is—

1. In a cable railroad, the combination, with the cable, of a rock-shaft arranged at an angle thereto and having an arm or spindle extending diagonally under said cable, substantially as set forth.

2. In a cable railroad, the combination, with the cable, of a rock-shaft arranged at an angle thereto and having an arm or spindle extending diagonally under said cable, and a roller journaled upon the said spindle, substantially as set forth.

3. In a cable railroad, the combination, with the cable, of a rock-shaft arranged parallel thereto, and an arm connected pivotally to said shaft and extending under said cable, substantially as set forth.

4. In a cable railroad, the combination, with the cable, of a rock-shaft, an arm connected pivotally to said rock-shaft and extending under the cable, and a roller journaled upon a spindle at the outer end of said arm, substantially as set forth.

5. In a cable railroad, the combination of the cable, a rock-shaft, an arm connected pivotally to the latter and extending under said cable, and a latch to retain said arm in position, substantially as set forth.

6. The combination of the cable, a rock-shaft, an arm connected pivotally to the latter and extending under the cable, a stop to prevent said arm from swinging against the direction of the movement of the cable, and a latch to retain the said arm in position, substantially as set forth.

7. The combination of the cable, a rock-shaft, an arm connected pivotally to the latter and extending under the cable, a spring to force said arm against the direction of the movement of the cable, and a latch to retain said arm in position, substantially as set forth.

8. The combination of the cable, a rock-shaft, an arm connected pivotally to the latter and extending under the cable, a spring to force said arm against the direction of the movement of the cable, a stop to limit the movement of said arm under the impulse of the spring, and a latch to retain said arm in position, substantially as set forth.

9. The combination of the cable, a rock-shaft, an arm connected pivotally to the latter and extending under the cable, a spring to force the said arm against the direction of the movement of the cable, a stop to limit the movement of said arm under the impulse of the spring, and a latch-lever connected pivotally to said arm and having at its inner end a lug to engage a recess in a disk attached to and forming part of the rock-shaft, the outer end of said latch-lever being extended under the cable, substantially as set forth.

10. The combination of the cable, a rock-shaft, an arm connected pivotally to the latter, a spring arranged to force said arm against the direction of the movement of the cable, a stop to limit the movement of said arm under the impulse of the spring, a latch-lever connected pivotally to said arm and adapted to retain it in position, and rollers journaled upon the outer ends of said arm and latch-lever, which are extended under the cable, substantially as set forth.

11. The combination of the cable, a rock-shaft arranged at an angle thereto and having a spindle extending diagonally under the cable, a roller mounted on said spindle, a rock-shaft arranged parallel to the cable, an arm connected pivotally to said rock-shaft, a spring arranged to force said arm against the direction of the movement of the cable, a stop to limit the movement of said arm under the impulse of the spring, a latch-lever pivoted to said arm and serving to retain it in position, rollers journaled upon the outer ends of said arm and latch-lever, which are extended under the cable, and mechanism whereby the said rock-shafts shall be automatically and simultaneously operated to tilt or elevate the several rollers and cause them to bear against the under side of the cable, substantially in the manner and for the purpose set forth.

12. In a cable railroad, the combination, with rock-shafts having arms or spindles extended under the cable and provided with rollers adapted to bear in an upward direction against said cable, of a lever arranged intermediately between said rock-shafts and suitably connected with the same, and an arm extending from said lever above and across the cable, substantially as and for the purpose set forth.

13. In a cable railroad, the combination, with the cable, of a rock-shaft arranged at an angle thereto and having a spindle extending diagonally under the cable and provided with a roller, a rock-shaft arranged parallel to the cable, an arm connected pivotally to said rock-shaft, a spring arranged to force said arm against the direction of the movement of the cable, a stop to limit the movement of said arm under the impulse of the spring, a latch-lever pivoted to said arm and serving to retain it in position, rollers journaled upon the ends of the arm and latch-lever, which are extended under the cable, a lever mounted upon a vertical pivot between said rock-shafts and suitably connected with the latter, an arm extending from said lever above and across the cable, a roller journaled in bearings extending laterally from said arm and adapted to rest upon the cable when the latter is raised from its supporting-pulleys, and an alarm-gong the hammer of which is actuated by the said roller, substantially as and for the purpose set forth.

14. The combination, with the cable, of the rock-shafts having arms or spindles extending under the same and provided with rollers, an intermediately-arranged lever suitably connected with said rock-shafts, an arm extending from said lever above and across the cable, a roller journaled to said arm and adapted to operate an alarm-gong, and a beveled-faced block arranged adjacent to said roller-carrying arm, substantially as and for the purpose set forth.

15. In a cable railroad, the combination of the rock-shafts having arms extending under the cable and provided with rollers adapted to bear upwardly against the same, an intermediately-arranged lever suitably connected with said rock-shafts, an arm extending from said lever above and across the cable, brackets or bearings extending laterally from said arm, the outer one of said brackets being beveled, as shown, a roller journaled in said brackets, and an alarm-gong adapted to be operated by said roller, substantially as and for the purpose set forth.

16. In a cable railroad, the combination, with the cable, of a lever mounted upon a vertical pivot in such a manner as to be capable of limited vibratory movement upon the same, arms extending upwardly from the ends of said lever and having laterally-extending perforated brackets, an arm extending from said lever above and across the cable, a rock-shaft arranged adjacent to said lever parallel to the cable, an arm at the inner end of the said rock-shaft extending upwardly through one of the perforated brackets attached to the arms of said lever, and a bent arm at the outer end of said rock-shaft carrying a hammer, substantially as and for the purpose set forth.

17. In a cable railroad, the combination of rock-shafts having arms or spindles extending under the cable and provided with rollers adapted to bear upwardly against the same, an intermediately-arranged lever having an arm extending above and across the cable, and a rock-shaft connected with and actuated by said lever and having an upwardly-extending bent arm carrying a hammer, substantially as and for the purpose set forth.

18. In a cable railroad, the combination of the rock-shafts having arms or spindles extending under the cable and provided with rollers adapted to bear upwardly against the same, an intermediately-arranged lever having an arm extending above and across the cable, a roller journaled in bearings or brackets extending laterally from said arm, an alarm-gong attached to said arm and adapted to be actuated by said roller, and a rock-shaft connected with and actuated by the operating-lever and having an upwardly-extending bent arm carrying a hammer, substantially as and for the purpose herein set forth.

In testimony that I claim the foregoing as my own I have hereto affixed my signature in presence of two witnesses.

HENRY A. PIERCE.

Witnesses:
E. I. FILER,
F. S. BAKER.